United States Patent [19]

Bruno et al.

[11] Patent Number: 4,707,729

[45] Date of Patent: Nov. 17, 1987

[54] SYSTEM FOR THE LINE-WISE COMPRESSION OF BINARY DATA OF A PICTURE FIELD IN A COMPRESSION DEVICE, DECOMPRESSION DEVICE FOR USE IN SUCH A SYSTEM, AND DISPLAY DEVICE INCLUDING SUCH A DECOMPRESSION DEVICE

[75] Inventors: Richard Bruno; Balthasar A. G. Van Luyt, both of Eindhoven, Netherlands

[73] Assignee: U.S. Philips Corporation, New York, N.Y.

[21] Appl. No.: 840,121

[22] Filed: Mar. 14, 1986

[30] Foreign Application Priority Data

Mar. 14, 1985 [NL] Netherlands .......................... 8500735

[51] Int. Cl.$^4$ ........................................... H04N 11/04
[52] U.S. Cl. ..................................... 358/13; 340/701; 358/133
[58] Field of Search ................... 358/133, 13; 340/701

[56] References Cited

U.S. PATENT DOCUMENTS

| | | | |
|---|---|---|---|
| 4,506,286 | 3/1985 | Kashigi | 358/13 |
| 4,514,754 | 4/1985 | Nillesen | 358/13 |
| 4,549,201 | 10/1985 | Tanaka | 358/13 |
| 4,622,585 | 11/1986 | Reitsma | 358/133 |
| 4,625,230 | 11/1986 | Tan | 358/13 |
| 4,633,295 | 12/1986 | von de Polder | 358/13 |

Primary Examiner—Howard W. Britton
Attorney, Agent, or Firm—Anne E. Barschall; William J. Streeter

[57] ABSTRACT

A system is described for the line-wise compression and decompression of a video color picture. The pixels are decoded in Y-U-V bit series, thus forming code words which each contain, for example six Y-bits of different significance and also one U-bit and one V-bit. The bit series, notably the more-significant series of Y-bits (Y5 . . . Y3) are independently compressed in a compression translator so as to from length indication codes. Furthermore, at least two bit series are combined in a logic circuit (44, 46, 48), the series of combination bits then being subjected to a compression operation (50). The reverse procedure takes place upon decompression.

20 Claims, 7 Drawing Figures

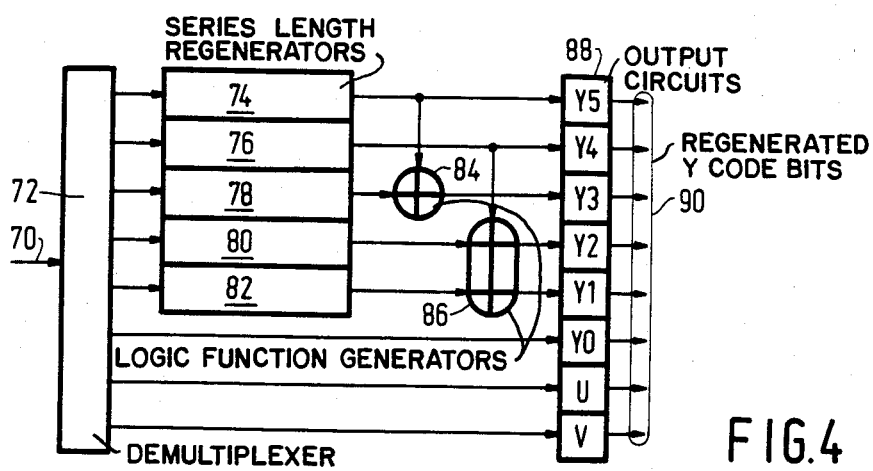
FIG.4
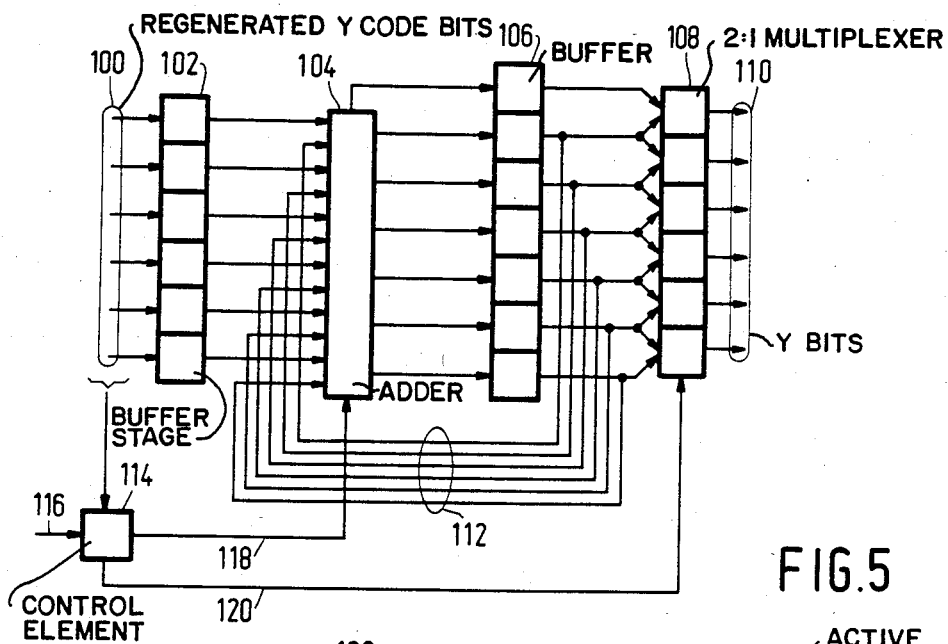
FIG.5
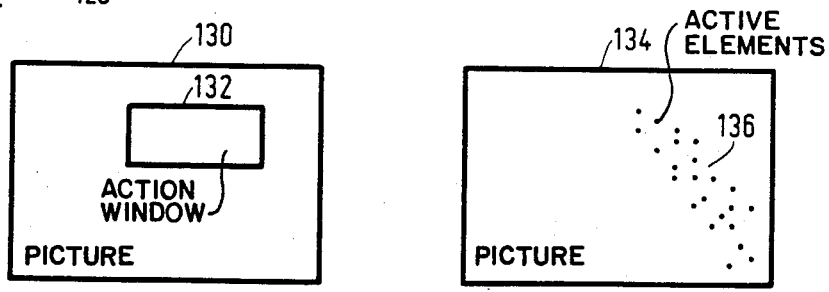
FIG.6a
FIG.6b

SYSTEM FOR THE LINE-WISE COMPRESSION OF BINARY DATA OF A PICTURE FIELD IN A COMPRESSION DEVICE, DECOMPRESSION DEVICE FOR USE IN SUCH A SYSTEM, AND DISPLAY DEVICE INCLUDING SUCH A DECOMPRESSION DEVICE

BACKGROUND OF THE INVENTION AND STATE OF THE ART

The invention relates to a system for the line-wise compression of binary data of a picture field in a compression device. The data is organized in a matrix of pixels. The system also decompresses the data, after the data passes through a medium, in order to reorganize the data so as to form the picture field. The system includes: a compression translator having an input for the data, a series length detector for detecting a series length of equivalent pixel bits for conversion into a series length indication which corresponds to the series length, and an output which is connected to said medium. A system of this kind is known from U.S. Pat. No. 4,622,585, issued Nov. 11, 1986 to Reitsma. The known device is suitable for black/white pictures and is optimized so as to achieve the largest possible compression factor. This requires a substantial data processing capacity.

SELECTED OBJECT AND SUMMARY OF THE INVENTION

It is an object of the present invention to enable the use of such compression techniques for colour pictures as well and to optimize the processing rate rather than the compression factor in order to make this system suitable for the display of motionless scenes (so-called "stills"). This is quite different from computer-generated pictures. Moveover the compression factor and the picture quality must still satisfy given minimum requirements. Such "stills" are recorded for example by means of a camera.

The object is achieved in accordance with the invention by encoding a colour picture in Y-U-V bit series where a respective number of bits of successive significance levels represents the Y-bit series within a code word. At least two more-significant Y-bit series are independently applied to the series length detector. Said input includes a logic circuit for translating at least two Y-bits per code word into a logic combination bit. The series of logic combination bits is independently applied to the series length detector for compression. The compression translator is active only for the formation of horizontal codes. The compression translator receiving per code word a total number of Y-bits and combination bits which equals the number of Y-bits within a code word. The Y-U-V code itself already is economical. The inventors have recognized the fact that the means series length of equivalent bits per series is an increasing function of the significance: the value does not change so rapidly for more-significant bits. Experiments have demonstrated that the logic combination of code bits of mutually different significance level offers additional possibilities for reducing the redundancy, without additional, complex operations being required, because this logic operation on average increases the series length for the combination bits. The compression factor increases as the series length increases. Notably when the logic function is an exclusive OR function and the value of different code bits changes simultaneously, the combination bit will not exhibit a transition, so that a larger series length will be obtained therefor. The invention is based on the experience that the brightness (Y-bit) often varies abruptly. Usually the value of a more-significant bit then changes, and the charge that the value or a less-significant bit then also changes approximates 50%.

SELECTED FURTHER ASPECTS OF THE INVENTION

A series length received can be advantageously increased by one pixel when the latter pixel can be represented as an interpolation pixel between the relevant series length and the next series length. Two series are thus encoded as a single series length indication, so that the compression factor is increased without increasing the complexity of the implementation. Sometimes a further advantage consists in that the interpolation between the respective colours of the directly preceding series length and the directly subsequent series length produces an intermediate colour which is not included in the normal range of colours, this creating the suggestion of a more natural picture in given circumstances. Further advantageous aspects are disclosed. When the compression operation does not have an effect for a given bit series, it can be transferred according to the bit-mapping principle.

The invention also relates to a decompression device for use in such a system, and a display device which includes such a decompression device. It has been found that this is an attractive realization expecially for home-interactive systems. The described device can be advantageously used for combining an active sub-picture which, for example, changes with a stationary background picture. In that case the background picture is formed once, while each time only the active sub-picture is decoded. The separation can be attactively realised with a non-dominant, transparent colour: where the latter colour is present, the background picture prevails and elsewhere the active sub-picture prevails. This results in an attractive solution for so-called animation.

BRIEF DESCRIPTION OF THE FIGURES

The invention will be described in detail hereinafter with reference to some figures:

FIG. 4 shows a block diagram of a decompression device;

FIG. 5 shows a block diagram of an interpolation device; and

FIGS. 6a, 6b show examples of a sub-division of a picture into active/non-active sub-pictures.

DESCRIPTION OF A PREFERRED EMBODIMENT

Figure 1:
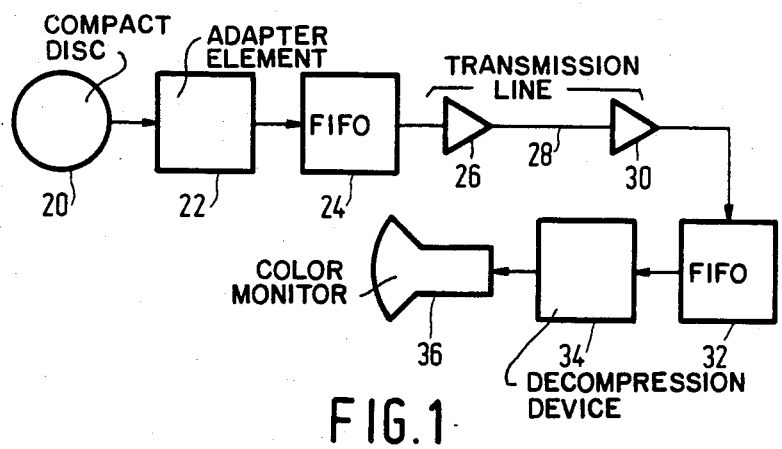
FIG. 1 shows a system in accordance with the invention.

FIG. 1 shows a system in accordance with the invention. Element 20 is a data source for stationary colour pictures, so-called "stills", but this source may also be capable of generating other information. In a preferred embodiment the source is formed by a player for a so-called "Compact Disc", an optically readable memory disc suitable for storage of high-quality audio information. Such discs have also been proposed as a storage means for picture information. However, the invention is not restricted to this specific storage method which must satisfy given conventions and is not restricted to this method of producing information. Therefore, other types of memory disc may also be attractive. In given circumstances the element 20 may also be a video camera. Element 22 is an adapter element: in the case of a so-called "Compact Disc" system, the data bits can be reconstructed therein, thus enabling correction for the effect of scratches and the like. In the case of a camera, the adapter element is formed by an encoder in which a redundancy reduction can be performed in accordance with the system of the present invention. In the case of storage on a "Compact Disc", this encoding operation has taken place prior to the storage on the so-called "master" disc, so that the redundancy-reducing code is virtual in the environment shown. The actual disc to be played is then produced by means of one of the replication techniques known for such a master disc. Element 24 is a first-in-first-out buffer memory employing a suitable technology. Elements 26, 28, 30 form a transmission line which includes suitable adaptation elements. Element 32 is a first-in-first-out memory employing a suitable technology; for example, it may be constructed by means of charge-coupled devices or a RAM memory. In given circumstances only one of the two memories 24/32 need be present. Element 34 is a decompression device which reconstructs the original pixel information. Element 36 is a colour monitor employing a suitable technology for the display of a picture field.

The pictures may be of a different nature: they may be photo-graphs when said "Compact-Disc" serves as a substitute for a picture album. The pictures may also be used as a background in a game, for example in a so-called "arcade" game. When the source is a "Compact Disc", all elements can be included in the monitor with the exception of the player. Alternatively, different modules may be combined in a so-called "home computer", while the monitor is a separate module.

THE COMPRESSION DEVICE

Figure 2:
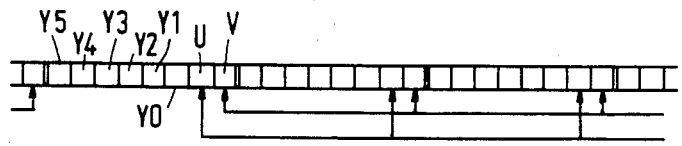
FIG. 2 illustrates the composition of the code words.

FIG. 2 illustrates the composition of the code words which contain the Y, U, V bits. The bits are represented by squares. Each 8-bit code word contains six Y-bits, one U-bit and one V-bit. The boundary between successive code words is denoted by a double line. The six Y-bits of one code word together form one Y-code group in which all bits have a different significance level. The six U-bits and the six V-bits of six successive code words form one code group in which all bits have a different significance level. For the compression, corresponding Y-bits of directly successive code words are considered. For the U-bits and the V-bits, bits of corresponding significance level appear each time only after six code words. The horizontal arrows denote a part of two U, V code groups.

Figure 3:
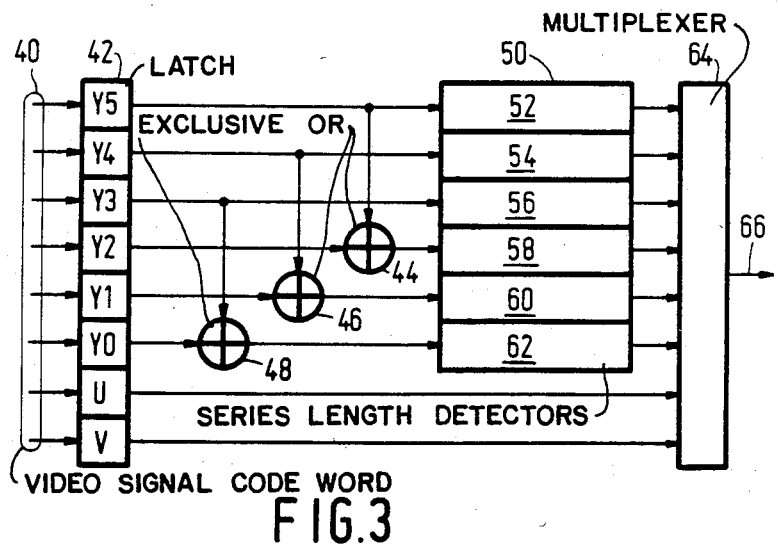
FIG. 3 shows a block diagram of a proposed compression device.

FIG. 3 shows a block diagram of a proposed compression device. The 8 bits of a code word of the video signal encoded as a Y-U-V convention code word appear on input 40. This code word consists of six Y bits Y5 . . . Y0, the last bit thereof being the least-significant bit. Also present are a U-bit and a V-bit. Thus, a code word appears per pixel. For the U bits and V bits six successive pixels are encoded together, these two six-bit codes being assigned to a corresponding number of code words by parallel/series conversion. Each of the latter code words thus contains 8 bits. The Y-U-V code is conventional and known per se. Elements 42 are input elements, for example trigger-to-latch circuits which act as buffer stages. Elements 52–62 are series length detectors. Elements 44–48 are logic exclusive-OR gates, each of which includes two inputs. The series length detectors operate as counters; such counters are known from the cited state of the art. The counters of the present embodiment have a comparatively small capacity, for example 32 positions. Upon reception of a bit which has the same value as the preceding bit, the position of the relevant counter is incremented by one. When a bit having the other value is received, the position of the counter is encoded in a series length indication and the counter is subsequently reset to the starting position. The series length indication contains more bits than the minimum number required for indicating a series length; consequently, in a stream of successive series length indications the start of a next series length indication can always be detected. In another embodiment all series length indications have the same length (for example, in this case 5 bits). The encoding efficiency is then comparatively low for short series lengths, but comparatively high for long series lengths.

In a given embodiment all series length detectors operate in the same way. However, it is not necessary for all detectors to operate according to the same compression strategy. First of all, the series length detector 52 may be optimized for example for long series lengths and the series length detector 62 may be optimized for short series lengths. This sub-division may be co-determined by the most commonly used picture structure for the relevant applications. The exclusive-OR circuits 44–48 modify the data content of a series of code bits, but do not influence the total picture information or the operation of the series length detectors.

When a series length indication has been formed, it is output in the direction of a multiplexer 64 which includes eight inputs and one output 66. The elements 42, 50 and 64 are controlled by a clock system (not shown). The series length indicators have a given first-in-first-out buffer capacity. In a first set-up this capacity suffices for the storage of the series length indications of the television lines or monitor lines. The precedure is such that first an entire picture line is compressed by means of exclusively horizontal codes. At the end (or at the beginning) each series of codes is provided with an "EOL" (end-of-line) indication which is unique among the various other possibilities. The relevant EOL generator is activated by a picture line flyback signal and the code is also stored in the first-in-first-out buffers. When an EOL indication is detected on the output of a first-in-first-out buffer by a detector (omitted for the sake of simplicity), the position of the multiplexer 66 is advanced by one. When the last first-in-first-out buffer has been vacated, the multiplexer is set to the first position again. If necessary, a further buffer mechanism may be implemented in order to compensate for the differences in the amounts of data content of successively compressed pictures before they are applied to the storage medium to be connected to the output 66.

Thus, in accordance with the foregoing three code bit series Y5, Y4, Y3 are independently compressed. The respective series of combination bits originating from the exclusive-OR gates 44–48 are also independently compressed. Compression is not performed for the U and V series; instead a bit-mapping principle is used, because compression would offer only inadequate results. In another embodiment the compression translator is also active for the U and/or V series, like the decompression translator to be described hereinafter. In that case a first-in-first-out buffer mechanism is also provided for these U and V series (for compression and for bit mapping).

In the embodiment shown, bits Y3/Y0, Y4/Y1 and Y5/Y2 are combined. These are pairs of bits of significance levels which do not appear in immediate succession. In other circumstances it will be advantageous, however, to combine bits of significance levels which do not appear in immediate succession. This is governed by the picture content. The logic combination circuits may even be constructed so as to be programmable, the programmming used being indicated at the beginning of a picture.

Another set-up of the series length detectors is as follows. The multiplexer 64 is each time advanced by one step in order to apply each time one bit of the respective bit series to the output 66. When the line length is known, the EOL indication can then be dispensed with (possibly only once per picture line). Furthermore, the amount of first-in-first-out storage space per bit series may be smaller, because it is then merely necessary to cope with the spread in the supply rate of the series length indications (as calculated in the number of indication bits). When a given bit series does not present further series length indications, the multiplexer receives from the relevant channel, for example, exclusively 0 bits which serve as filler material. The storage efficiency of the medium is often reduced in such cases. In the latter case the bit series with bit mapping (for example only U and V) should be treated differently.

In the above two embodiments the multiplexer is switched per line and per bit respectively. It is alternatively possible to switch the multiplexer, for example per byte or in another rhythm. Usually the buffering in the compression translators may then be less, causing a slightly smaller compression factor. In the case of switching per byte, an EOL byte is inserted again at the end of a line, so that this position of the multiplexer is deactivated for the remainder of the relevant line. It is to be noted that the series length detectors can be used multiplexed over the various bit series.

THE DECOMPRESSION DEVICE

FIG. 4 shows a block diagram of a decompression device. This device is constructed so as to be substantially symmetrical with respect to the compression device. The bits of the series length indications and the bits of the bit mapping are serially received on an input 70. They are distributed between eight parallel channel in a demultiplexer 72. The demultiplexer is switched in the same way as the multiplexer 66, that is to say once per bit, each time after a fixed number of bits, or each time after all series length indications have been received for a relevant bit series of a television line. There are five series length regenerators 74–82. It is assumed that bit Y0 was mapped per bit. This will be advantageous notably for less-significant Y bits. For more-significant bits, such as Y5, independent compression will usually be attractive. Decompression can usually be performed on the basis of the state of the art or a similar algorithm. Thus, the series lengths appear on the outputs. The outputs of the elements 74 and 78 are combined in an exclusive-OR element. It is to be noted that the embodiments shown in the FIGS. 3 and 4 do not correspond. As regards FIG. 4, the function for the combination bit C3 which takes the place of the code bit $Y3:C3=Y5\oplus Y3$ was formed in the compression device. In the compression device the following combination is formed (element 84): $Y'_3 = C3 \oplus Y5 = Y5 \oplus Y3 \oplus Y5 = Y3$. The symbol $\oplus$ means an exclusive-OR function or modulo-2 addition. Similarly, the bit pair Y2, Y1 is restored in element 86 by means of a logic function. One possibiltiy is to add the bit Y5 in parallel modulo-2 to the two combination bits originating from the elements 80, 82. Another possibility consists in that $Y2=C2\oplus Y4$; $Y1=C2\oplus C1\oplus Y4$. To this end, the appropriate logic combination bits must be formed each time at the compression side. It is to be noted that C2 is supplied by the element 80 and that C1 is supplied by the element 82. Functions other than exclusive-OR functions can be used per se, provided that all series of code bits can be restored again.

THE INTERPOLATION DEVICE

FIG. 5 shows a block diagram of an interpolation device. The series of Y code bits which have a width of six bits, as regenerated on output 90 in FIG. 4, arrive on input 100. If necessary, element 102 forms a buffer stage, for example, a six-fold latch circuit. Element 104 is an adder which has a width of six bits and which indcludes six sum bit outputs plus a carry output of highest significance. Element 106 forms a buffer circuit which has a width of seven bits and which is constructed, for example, as latch stages again. The six least-signifacant bits thereof can be returned to the adder circuit. Element 108 is a 2:1 multiplexer having a width of six bits, so that a group of Y bits having a width of six bits can be output on output 110. By selective control of the multiplexer 108, the multiplexer can conduct a bit group received either without modification or shifted over one bit position to the less-significant side.

Element 114 is a control element which receives a control signal on input 116 and which can output two control signals on outputs 118, 120.

In a simple case bit series are encoded as follows:

| | |
|---|---|
| oXo: | series length 1 |
| 0X1: | series length 2 |
| 1X00010: | series length 3 |
| 1X11111: | series length 32. |

When X has the value "1", a bit series having a length 1 must be regenerated at the end of the actual bit series to be regenerated and a colour must be interpolated between the directly preceding bit series and the directly subsequent bit series. When X has the value "0", such an interpolation need not take place. This X is present only for the most-significant bit series (Y5). The second bit X is recognized in the series length regenerator 74 for the most-significant bit series and is applied, via a connection (not shown) to an input 116. The value "1" then activates an addition in element 104 of the actual code word and the next code word (this next code word is retained in element 102 in order to determine the first pixel of the next bit series. Furthermore, in element 108 this "1" controls a shift, so that a division by two occurs.

The code shown is rather unfavourable for small values of the series length, but much more favourable in the case of large series lengths. Other encoding diagrams are known from literature. A definite choice for a given apparatus can be made on the basis of expected properties of the pictures. In given cases the conversion can be realized by means of reprogrammable logic circuitry.

In the present embodiment the following codes are not used:

1X00001
1X00000 and corresponding codes in the absence of the X bit controlling the interpolation. These codes can be used as follows:

(a) EOL: end-of-line indication;
(b) for indicating that the next series length has the same bit value as the current series; this may thus mean that the current series has a length of 32 bits without change of value 1X11111 indicates the same length with a change;
(c) for indicating that the relevant picture line is the last one of the picture;
(d) for indicating an error.

The most-significant bit series may comprise all four codes; the others only the cases (a) and (b). Similarly, such "special" codes can be inserted for other encoding conventions. A specific advantage of the interpolation consists in that the interpolation colour need not be included in the original range of colours; in order to realize this extension, the colour generator table must be addressed by both colours to be interpolated, so that the real colour signals are interpolated rather than the addresses. The addition of colour signals can be realized by means of known analog circuits.

TRANSPARENT PICTURES

FIGS. 6a, 6b show examples of a picture sub-division into active/non-active zones. Such a sub-division may be attractive, for example for so-called animated pictures. Such pictures may comprise a combination of photographic pictures (background) and drawings (figures which move in the way of a cartoon). Furthermore, the foreground as well as the background may also be formed by a drawing or photographs. The background is usually static and merely provides a situation or indication of the atmosphere. The action then takes place at the foreground. In FIG. 6a this action is limited to the window 132 which occupies a comparatively small part of the picture 130. The storage on the medium may then be restricted to the picture content of the background plus the successive contents of the window 132 in which the changes take place. Such a window can be proportioned by way of the terminal points of a diagonal. Notably when a random access local picture memory is present, the information of these two terminal points can be used to perform a selection between background information and foreground information.

FIG. 6b shows another example of such a picture sub-division. The action is the movement of a group of small elements 136, for example a shower of stars. The method involving the window shown in FIG. 6a is far less attractive for the situation in FIG. 6b, because the surface area of the window would not be much smaller than that of the entire picture. A solution can be to define the foreground picture across the entire picture surface. Each of the active elements 136 determines its own window in that the colour code is arbitrary but monovalent for the remainder of the picture. This monovalent colour is a non-dominant transparent colour, for example dark gray. This one colour, therefore, may not be used for the elements 136 to be displayed.

This colour is recognized in element 114, which for this purpose includes a colour detector which is connected to the input 100 in FIG. 5. When the non-dominant, transparent colour is detected, the control element 114 outputs a signal (not shown) with the result that the output signal on the output 110 contains exclusively "0" signals. One possibility consists in that the multiplexer 108 has three states: "conduct without shift", "conduct with shift" (=interpolated) "closed". The non-dominant, transparent colour is treated in the same way as the other colours, i.e. the relevant bit series are also compressed and decompressed. Because the active part of the picture is comparatively small, the compression factor may be comparatively large: long series lengths on average.

When active, the output signal on the lines 110 addresses a colour generator table (colour loop-up table or CLUT). If necessary, further FIFO buffering may be provided at the output of the element 108 in order to synchronize the supply of information and the mapping on the element 36. This FIFO buffer may contain, for example a complete picture. In that case the transparent colour must be indicated by an additional bit or the transparency must be detected at the end of the FIFO buffering operation instead of in the element 116. When a complete picture memory is present for the background picture, the transparency indication makes a selection between the two memories in order to select the sub-picture active within the window and the background picture, respectively.

What is claimed is:

1. A system for the line-wise compression of binary data of a picture field in a compression device, which data is organized in a matrix of pixels, and for decompressing the data, after the data passes through a medium, in order to reorganize the data so as to form said picture field, said system comprising:
   a compression translator having an input for said data,
   a series length detector for detecting a series length of equivalent pixel bits for conversion into a series length indication which corresponds to the series length, and
   an output which is connected to said medium,
   wherein the improvement comprises that:
   for a colour picture which is encoded in Y-U-V bit series where a respective number of bits of successive significance levels represents the Y-bit series within a code word, at least two more-significant Y-bit series are independently applied to the series length detector, said input including a logic circuit for translating at least two Y-bits per code word into a logic combination bit, a series of logic combination bits being independently applied to the series length detector for compression,
   the compression translator being active only for the formation of horizontal codes, the compression translator producing per code word a total number of Y-bits and combination bits which equals the number of Y-bits within a code word.

2. A system as claimed in claim 1, wherein said input includes at least two logic circuits for translating for each code word at least two different groups which each comprise at least two Y-bits of mutually non-successive significance levels per group into a number of logic combination bits which equals the number of groups, the series of logic combination bits being independently applied to the series length detector for compression.

3. A system as claimed in claim 1, wherein for each code word at least two Y-bits of directly successive significance level are applied to a said logic circuit in order to form a logic combination bit therefrom.

4. The system of claim 1 comprising means for decompressing the data after the data passes through a medium in order to reorganize the data to form said picture field.

5. A device for the line-wise compression of binary data of a picture field, which data is organized in a matrix of pixels, comprising a compression translator having:
  (a) an output for said data;
  (b) a series length detector for detecting a series length of equivalent pixel bits for conversion into a series length indication which corresponds to the series length, and
  (c) an output which is connected to said medium, wherein the improvement comprises that:
  (d) for a colour picture which is encoded in Y-U-V bit series where a respective number of bits of successive significance levels represents the Y-bit series within a code word, at least two more-significant Y-bit series are independently applied to the series length detector, said input including a logic circuit for translating at least two Y-bits per code word into a logic combination bit, a series of logic combination bits being independently applied to the series length detector for compression,
  (e) the compression translator is active only for the formation of horizontal codes,
  (f) the compression translator produces per code word a total number of Y-bits and combination bits which equals the number of Y-bits within a code word.

6. A system as claimed in claim 1 or 5 wherein at least one logic circuit comprises an exclusive-OR element, at least one of the bit series translated therein being independently applied to the series length detector.

7. A system as claimed in claim 1 or 5, wherein at least one less-significant bit series is applied to the medium in a bit-mapped manner.

8. A system as claimed in claim 1 or 5, wherein for at least one bit series received, the compression translator combines a received, detected series length with a directly subsequent code bit of the same significance level, which code bit represents a series length "1", in order to form a series length which has been increased by "1", the series length indication thus formed being provided with an extension indication in order to represent the pixel thus suppressed upon decompression as an interpolation between directly subsequent and directyly preceding series.

9. A device for decompression of data of a picture field, said data having been line-wise compressed from a matrix of pixels prior to transmission through a medium, said decompression device reorganizing the data to form said picture field, said decompression device including a decompression translator having:
  (a) an input at which said data is received;
  (b) a series length regenerator for regenerating a series length from a series length indication in said data which indication corresponds to the series length of a coded pixel bit; and
  (c) an output at which decompressed code bits are provided,
wherein the improvement comprises that:
  (d) for a color picture which prior to transmission was encoded in Y-U-V bit series, a respective number of bits of successive significance levels representing the Y-bit series within a code word prior to encoding, the series length regenerator has an output providing at least one first bit stream, each bit of which is a combination of at least two more significant Y-bits, said output also providing at least one second bit stream, said output including a logic circuit for translating from a logic combination bit at least two encoded Y-bits per code word, a series of logic combination bits being independently output from the series length regenerator as a part of decompression,
  (e) the decompression translator is active only for horizontal codes,
  (f) the decompression translator receives for each code word a combined number of Y-bits and combination bits which equals the total number of Y-bits within a code word.

10. A decompression device as claimed in claim 9, wherein the series length regenerator is also active for the U-bits and V-bits.

11. A display device including a device for decompression of data of a picture field, said data having been line-wise compressed from a matrix of pixels prior to transmission through a medium, said decompression device reorganizing the data to form said picture field, said decompression device including a decompression translator having:
  (a) an input at which said data is received;
  (b) a series length regenerator for regenerating a series length from a series length indication in said data which series length indication corresponds to the series length of a coded pixel bit; and
  (c) an output at which decompressed code bits are provided;
wherein the improvement comprises that:
  (d) for a color picture which prior to transmission was encoded in Y-U-V bit series, a respective number of bits of successive significance levels representing the Y-bit series within a code word prior to encoding, the series length regenerator has an output providing at least one first bit stream, each bit of which is a combination of at least two more significant Y-bits, said output also providing at least one second bit stream, said output including a logic circuit for translating from a logic combination bit at least two encoded Y-bits per code word, a series of logic combination bits being independently output from the series length regenerator as a part of decompression,
  (e) the decompression translator is active only for horizontal codes,
  (f) the decompression translator receives for each code word a combined number of Y-bits and combination bits which equals the total number of Y-bits within a code word.

12. The device of claim 9 or 11, wherein said output includes at least two logic circuits for translating into each code word at least two different groups, from a number of logic combination bits which equals the number of groups, each group comprising at least two Y-bits of mutually non-successive significance levels, the series of logic combination bits being independently output from the series length regenerator as a part of decompression.

13. The device of claim 9 or 11, wherein for each code word at least two Y-bits of directly successive significance level are output from one of said logic circuits and thereby formed from a logic combination bit.

14. The device of claim 9 or 11, wherein at least one logic circuit comprises an exclusive-OR element at least one of the bit series being translated therein being independently output from the series length regenerator.

15. The device of claim 9 or 11, wherein at least one less-significant bit series is received from the medium in a bit-mapped manner.

16. The device of claim 9 or 11, wherein under control of an extension indication of a series length an interpolator is activated so as to generate an interpolation color for a pixel between a pixel of the relevant series length and a pixel of the directly subsequent series length.

17. A display device as claimed in claim 16 wherein there is provided a window generator device for activating a colour look-up table within a window by means of a sub-picture which is active only for the relevant window, and for generating otherwise a background picture in that outside the window said sub-picture has only a non-dominant, transparent colour.

18. The device of claim 17 wherein said window generator device activates said colour look-up table within a plurality of windows, said windows surrounding a plurality of points of action.

19. The device of claim 9 or 11 wherein said second bit stream comprises a stream of Y-bits.

20. The device of claim 9 or 11 wherein said second bit stream comprises bits which are a second combination of at least two Y-bits.

* * * * *

UNITED STATES PATENT AND TRADEMARK OFFICE
CERTIFICATE OF CORRECTION

PATENT NO. : 4,707,729
DATED : November 17, 1987
INVENTOR(S) : Richard Bruno et al It is certified that érror appears in the above-identified patent and that said Letters Patent is hereby corrected as shown below:

IN THE CLAIMS

Claim 5, line 5    cancel "output"

insert --input--

Signed and Sealed this

Fourth Day of December, 1990

Attest:

HARRY F. MANBECK, JR.

Attesting Officer

Commissioner of Patents and Trademarks